US005475270A

United States Patent [19]
McRoy

[11] Patent Number: 5,475,270
[45] Date of Patent: Dec. 12, 1995

[54] STARTER MOTOR ENERGIZATION CIRCUIT FOR AN INTERNAL COMBUSTION ENGINE

[75] Inventor: William A. McRoy, Ann Arbor, Mich.

[73] Assignee: Ford Motor Company, Dearborn, Mich.

[21] Appl. No.: 417,711

[22] Filed: Apr. 6, 1995

Related U.S. Application Data

[63] Continuation of Ser. No. 2,004, Jan. 8, 1993, abandoned.

[51] Int. Cl.[6] ........................ H02J 7/00

[52] U.S. Cl. ........................ 307/10.6; 361/154; 361/160

[58] Field of Search ........................ 307/10.1–10.7, 307/9.1; 290/48; 361/194, 166–167, 154, 160; 123/198 B, 146.5 R, 179.3, 179.5; 340/825.32, 825.34

[56] References Cited

U.S. PATENT DOCUMENTS

| | | | |
|---|---|---|---|
| 2,761,978 | 9/1956 | Piumi | 290/22 |
| 3,029,350 | 4/1962 | Noddin | 290/31 |
| 3,866,960 | 2/1975 | Chohan | 290/38 |
| 4,122,354 | 10/1978 | Howland | 290/31 |
| 4,731,543 | 3/1988 | Buetemeister et al. | 290/38 R |
| 4,962,350 | 10/1990 | Fukuda | 323/283 |
| 5,210,481 | 5/1993 | Brambilla et al. | 323/316 |

FOREIGN PATENT DOCUMENTS

| | | |
|---|---|---|
| 0492375A1 | 7/1992 | European Pat. Off. . |
| 1926057 | 11/1969 | Germany . |
| 1948202 | 4/1971 | Germany . |
| 0111028A2 | 6/1984 | Germany . |
| 0166125A1 | 1/1986 | Germany . |
| 3928225A1 | 3/1990 | Germany . |
| WO-A-91/15058 | 10/1991 | Germany . |
| 4142666A1 | 7/1993 | Germany . |
| 1252795 | 11/1971 | United Kingdom . |

*Primary Examiner*—Peter S. Wong
*Assistant Examiner*—Aditya Krishnan
*Attorney, Agent, or Firm*—Kevin G. Mierzwa; Roger L. May

[57] ABSTRACT

An energizing circuit for a permanent magnet internal combustion starter motor having a pull-in coil, a hold-in coil and plunger contacts connected to a single terminal which is switchable between a direct current power source and ground which are magnetically independent.

3 Claims, 1 Drawing Sheet

STARTER MOTOR ENERGIZATION CIRCUIT FOR AN INTERNAL COMBUSTION ENGINE

This is a continuation Ser. No. 08/022,004 filed Jan. 8. 1993 now abandoned.

BACKGROUND OF THE INVENTION

The invention relates generally to a circuit for energizing a permanent magnet starter motor for an internal combustion engine and more specifically to a circuit using pull-in and hold-in coils of a solenoid plunger to engage the pinion gear of a permanent magnet starter motor with the flywheel of an internal combustion engine.

Electric starter motor solenoid circuits using pull-in and hold-in coils are known which upon energization move a plunger driven by the coils until a pinion-type gear linked to the plunger meshes with the flywheel of the engine. One such prior art circuit is shown in FIG. 1 for example, wherein a solenoid 20 is connected between a power source and the starter motor 30. The power source includes a battery 14, a starter relay 12, and an ignition switch 10. The solenoid 20 comprises a set of plunger contacts 32 on the end of a conventional solenoid plunger 34 that is spring biased to place the contacts 32 in a normally open condition when the solenoid is deenergized. The movement of plunger 34 to close the plunger contacts 32 against the spring bias is provided by the magnetic field produced by pull-in coil 18 and a hold-in coil 16 when they are energized. The relay 12 contains a set of normally open contacts 13 and when energized closes the circuit so that both pull-in coil 18 and hold-in coil 16 of the solenoid become energized by the battery. When energized by the battery, the pull-in coil 18 causes plunger 34 of solenoid 20 to be drawn into position which closes solenoid contacts 32 and the starter motor 30 becomes connected to battery 14, thereby shunting pull-in coil 18 from the circuit. Hold-in coil 16 remains energized and has sufficient field strength to hold plunger contacts 32 closed until relay 12 is deenergized.

The pull-in coil 18 and hold-in coil 16 are made of insulated wound wire having an equal number of turns. This is conventionally important because upon deenergization of the circuit, the pull-in coil 18 and hold-in coil 16 are physically situated to magnetically cancel each other when relay 12 opens. The cancellation is needed because the permanent magnet starter motor 30 continues to spin after power is removed, thus becoming a generator while it is spinning down. Under the condition that the pull-in coil 18 is matched with hold-in coil 16, the following sequence occurs at the instant following the opening of ignition switch 10. Relay contacts 13 open, solenoid contacts 32 remain closed and battery 14 is still providing power to motor 30. The current flow through pull-in coil 18 is in the opposite direction of what it was when ignition switch 10 was initially closed while the direction of current flow through the hold-in coil. 16 is not changed. Because the magnetic field of the coils cancel each other, the solenoid plunger is magnetically released and the biasing spring (not shown) causes plunger contacts 32 to open and disconnect battery 14 from motor 30. The energy produced by the still-spinning motor 30 is dissipated through the hold-in coil 16 and the pull-in coil 18. Because the pull-in and hold-in coils are subject to a harsh environment, insulation on the coil windings can become degraded, causing shorts between the windings. Thus the effective number of windings in each coil are subject to change over time. If the number of turns in the coils are not matched, the magnetic field will not fully cancel and plunger contacts 32 may remain closed thereby leaving the starter motor 30 still connected to battery 14.

Normally the battery 14 and starter motor 30 are located at different locations in the engine compartment of the automobile and two power connections are provided to the solenoid 20 at terminals 22 and 24. A connection through the relay contacts 13 is provided at terminal 24 and a direct connection to battery 14 is provided at terminal 22 to one of the solenoid plunger contacts 32.

It would be desirable to continue to electrically isolate the battery from the starter motor and have only one battery connection to the solenoid.

It would also be desirable to eliminate the dependency of the circuit on the number of coils provided in the pull-in and hold-in coils.

SUMMARY OF THE INVENTION

The present invention uses a single-pole double-throw starter relay switching means to eliminate the dependency of the starter circuit on the matched number of turns in the pull-in and hold-in coils. The starter relay of the present invention also serves to electrically isolate the starter motor circuit from the battery with a single connection, thereby reducing number of components and improving the assembly.

The starter motor circuit has a switching means for switching between a direct current power source and ground. A solenoid circuit is provided having a pull-in coil and a hold-in coil, and a moveable plunger containing a set of plunger contacts. The pull-in coil controls the movement of the plunger from a first position where said plunger contacts are open to a second position where said plunger contacts are closed. The hold-in coil holds the plunger in the second position until the switching means is released, when released the plunger returns to the first position. A plunger contact, the hold-in coil, the pull-in coil, and switching means are each connected to a common node. The pull-in coil is connected between the common node and the starter motor. The plunger contacts are connected in parallel with the pull-in coil, between the common node and the starter motor so when the plunger contacts are closed in the second position, the plunger contacts provide a shunt for said pull-in coil. The hold-in coil is connected between the common node and ground.

The switching means can be a single-pole double-throw relay or other electronic switching device which is operative to selectively connect the common node to either ground or the direct current power source.

One advantage of this configuration is that it allows the coils to be magnetically independent upon the removal of power to the circuit, so that the plunger will disengage the engine whether or not the coils are matched to contain the same number of turns.

Another advantage of this system is that, except during cranking, the starter circuit is electrically isolated from the positive battery terminal. One wire connection to the circuit is eliminated, thereby reducing assembly time and material cost.

DETAILED DESCRIPTION OF A PREFERRED EMBODIMENT

Figure 1:
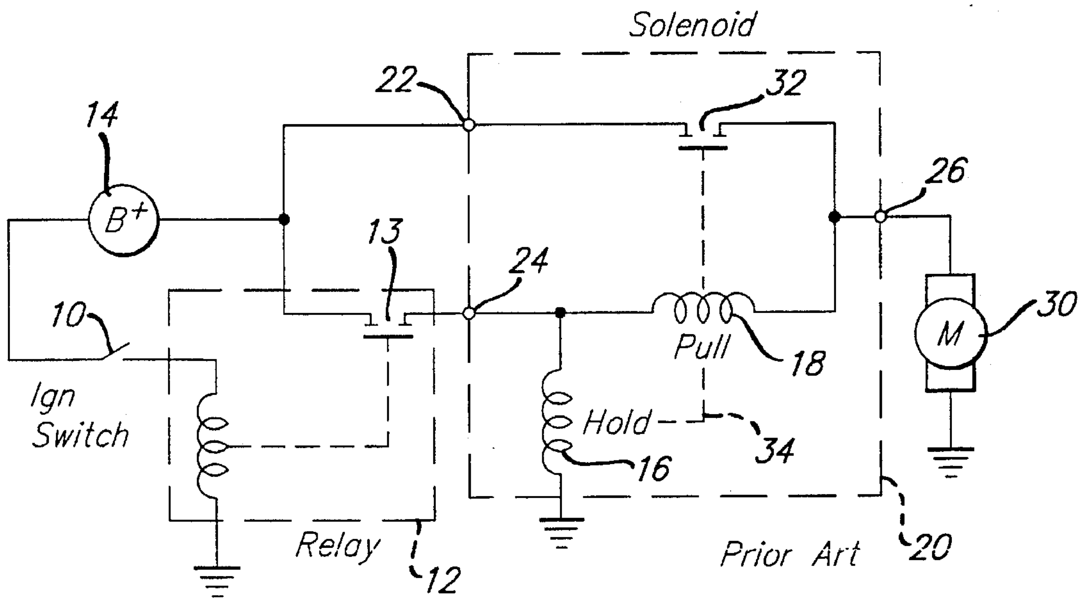
FIG. 1 is a schematic of a prior art starter motor circuit.
Figure 2:
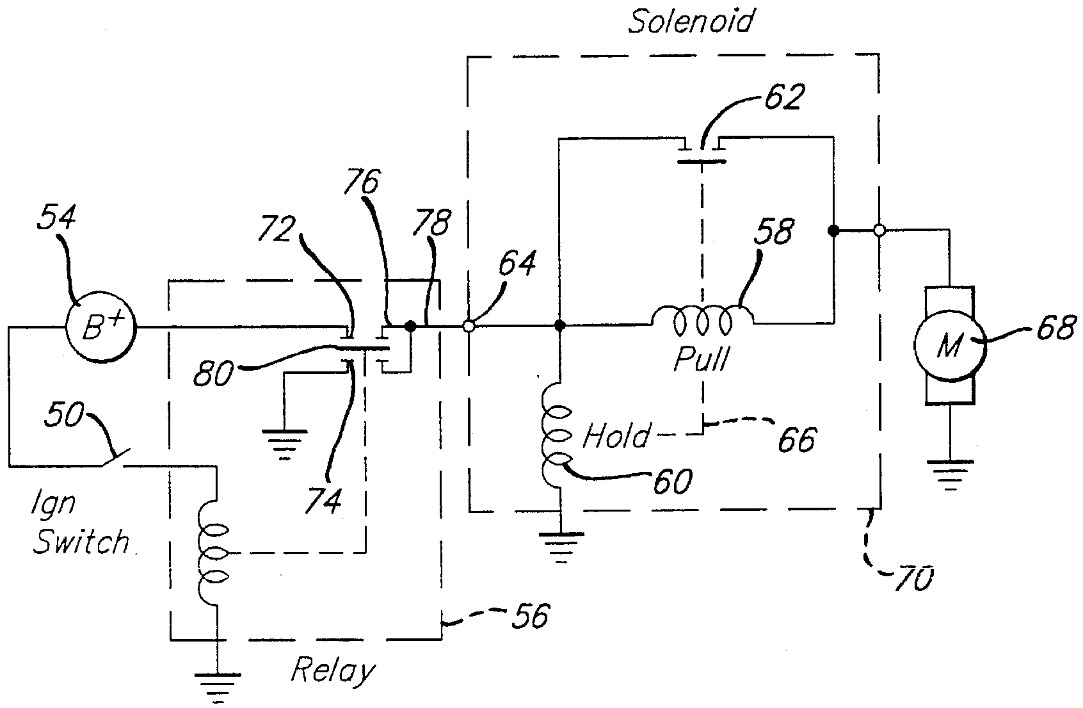
FIG. 2 is a schematic of a preferred embodiment of the present invention.

Referring now to FIG. 2, a direct current power source includes a battery 54. An ignition switch 50 and a starter relay 56 provide power to a starter motor 68 through a solenoid 70. Solenoid 70 has a pull-in coil 58, a hold-in coil 60, a plunger represented by broken line 66, and a set of plunger contacts 62 which are connected to a common node, at starter terminal 64. Starter relay 56 provides either positive battery voltage or ground potential to starter terminal 64. Pull-in coil 58 is connected between starter terminal 64 and one terminal of permanent magnet starter motor 68. Hold-in coil 60 is connected between starter terminal 64 and ground. Plunger contacts 62 are connected in parallel with pull-in coil 58 and, when closed, provide a low impedance shunt to pull-in coil 58. The housing of the starter motor 68 is connected to ground to complete the circuit.

Relay 56 has at least two contacts 72 and 74. Contact 72 is connected to battery 54. Contact 74 is connected to ground potential. The preferred embodiment uses a single pole double throw relay having an additional set of contacts 76 which are connected together to form an output terminal 78. Relay 56 also has a contact arm 80 which electrically connects either contact 72 or contact 74 to contacts 76.

In operation, the starting or "cranking" process of the internal combustion engine is initiated by closing ignition switch 50 which causes the output of starter relay 56 to switch from ground potential to the positive voltage of battery 54. Relay 56 has a set of contacts which provide single-pole double-throw switching. Another relay or device could be used as long as it is capable of switching between power or "on" and ground states. In the "on" state, with relay 56 energized, battery 54 is connected to starter terminal 64. In the ground or "off" state with relay 56 deenergized, starter terminal 64 is connected to vehicle ground through relay 56.

To start the engine, a vehicle operator turns a key (not shown) that closes ignition switch 50 and causes relay 56 to switch from the ground or "off" state, to the positive battery voltage, or "on" state. Pull-in coil 58 and hold-in coil 60 move plunger 66 of solenoid 70 so that a conventional-type pinion gear (not shown) moves into engagement with the flywheel of an engine (not shown) and simultaneously moves plunger contacts 62. Due to the high impedance of pull-in coil 58, starter motor 68 will not begin to turn until pull-in coil 58 is shunted by the closing of the plunger contacts 62, which provides a low impedance path for current from battery 54 to starter motor 68. When plunger 66 is fully engaged and plunger contacts 62 are closed to shunt pull-in coil 58 from the circuit, hold-in coil 60 provides sufficient force to-keep plunger 66 in a position so that the gear remains engaged with starter motor 68 and contacts 62 remain closed.

During deenergization, (after the engine has started and the operator releases the key) ignition switch 50 is opened and starter terminal 64 is grounded via relay 56. In turn, hold-in coil 60 becomes shorted to ground and starter motor 68 rapidly decelerates. Until the magnetic field in hold-in coil 60 collapses, pull-in coil 58 remains shunted by plunger contacts 62 and both terminals of starter motor 68 are effectively grounded. When the magnetic field collapses in hold-in coil 60 and plunger contact 62 opens, any remaining current produced by the still-spinning starter motor is shorted to ground through pull-in coil 58. In this configuration, a braking effect from initially applying ground potential to both terminals of starter motor 68 causes starter motor 68 to decelerate more rapidly than prior art configurations. Since hold-in coil 60 and pull-in coil 58 are independently shorted, starter motor 68 will disengage from the internal combustion engine without respect to the number of turns in the coils.

What is claimed is:

1. A circuit to energize a permanent magnet starter motor for an internal combustion engine comprising:

a direct current power source;

a ground potential;

switch means having a first contact electrically connected to said direct current power source, a second contact connected to said ground potential, and an output terminal for selectably switching said output terminal between one of said first and second contacts;

a solenoid circuit including a pull-in coil, a hold-in coil, and a moveable plunger having a set of plunger contacts, one of said plunger contacts, said hold-in coil, said pull-in coil, and said output terminal directly electrically connected at a common node;

wherein said pull-in coil is electrically connected between said common node and said starter motor, said plunger contacts are electrically connected between said common node and said starter motor, and said hold-in coil is electrically connected between said common node and ground, said pull-in coil being responsive to said switch means switching said power source to said common node to control said plunger from a first position where said plunger contacts are open to a second position where said plunger contacts are closed, said hold-in coil being responsive to said switch means switching said power source to said common node for holding said plunger in said second position after said plunger contacts are closed where upon switching said common node to ground potential said starter motor is shunted directly to said ground potential through said plunger contacts, said hold-in coil is shunted to ground potential and whereon the opening of said plunger contacts said pull-in coil dissipates energy from said starter motor.

2. The circuit as in claim 1, wherein the switching means is comprised of a single-pole double-throw relay.

3. A method for controlling the operation of a starter motor using an apparatus having a direct current power source, a ground potential, a switching means switching an output terminal between said ground potential and said direct current power source and a solenoid circuit, said solenoid circuit including a pull-in coil, a hold-in coil, and a moveable plunger having a set of plunger contacts, wherein said plunger contacts, said hold-in coil, said pull-in coil, and said switching means each are electrically connected to a common node, said pull-in coil is electrically connected between said common node and said starter motor, said plunger contacts are electrically connected between said common node and said starter motor and said hold-in coil is electrically connected between said common node and ground, said method comprising the steps of:

electrically connecting said output terminal to said direct current power source;

energizing said pull-in coil and said hold in coil;

moving said plunger;

shunting said pull-in coil by closing said plunger contacts;

electrically connecting said output terminal to said ground potential;

shunting said hold-in coil to ground potential;

opening said plunger contacts thereby connecting one end of said pull-in coil to said ground potential and the opposite end of said pull-in coil to said starter motor;

dissipating energy from said starter motor through said pull-in coil.

* * * * *